US007963598B2

(12) United States Patent
Akaike et al.

(10) Patent No.: US 7,963,598 B2
(45) Date of Patent: Jun. 21, 2011

(54) HEAD REST CONTROL SYSTEMS

(75) Inventors: Fumitoshi Akaike, Nisshin (JP); Seiya Nishimura, Okazaki (JP); Tomokazu Moriyama, Toyota (JP); Kiyoka Matsubayashi, Aichi-ken (JP)

(73) Assignees: Toyota Boshoku Kabushiki Kaisha, Aichi (JP); Toyota Jidosha Kabushiki Kaisha, Aichi (JP)

( * ) Notice: Subject to any disclaimer, the term of this patent is extended or adjusted under 35 U.S.C. 154(b) by 390 days.

(21) Appl. No.: 11/792,552

(22) PCT Filed: Dec. 6, 2005

(86) PCT No.: PCT/JP2005/022373
§ 371 (c)(1),
(2), (4) Date: Apr. 16, 2008

(87) PCT Pub. No.: WO2006/062098
PCT Pub. Date: Jun. 15, 2006

(65) Prior Publication Data
US 2009/0121526 A1 May 14, 2009

(30) Foreign Application Priority Data

Dec. 9, 2004 (JP) ................. 2004-357113
Dec. 28, 2004 (JP) ................. 2004-380126

(51) Int. Cl.
*B60R 21/00* (2006.01)
*B60R 22/00* (2006.01)
(52) U.S. Cl. ............... 297/216.12; 701/45; 701/49
(58) Field of Classification Search ............. 297/216.12, 297/216.1, 391, 217.3, 217.2; 701/45, 49
See application file for complete search history.

(56) References Cited

U.S. PATENT DOCUMENTS

| 5,748,473 | A | 5/1998 | Breed et al. |
| 6,134,492 | A | 10/2000 | Breed et al. |
| 6,331,014 | B1 | 12/2001 | Breed |
| 6,402,195 | B1 | 6/2002 | Eisenmann et al. |

(Continued)

FOREIGN PATENT DOCUMENTS

DE     34 27 466 A1     3/1985

(Continued)

*Primary Examiner* — Milton Nelson, Jr.
(74) *Attorney, Agent, or Firm* — Patterson Thuente Christensen Pedersen P.A.

(57) ABSTRACT

It is one object of the present invention to provide a control for moving a head rest in response to a signal from a sensor detecting a distance between the head rest and a head of a passenger, in which even if the head of the passenger moves within a predetermined range, the head rest can be prevented from moving depending on the motion of the head of the passenger so as to remove discomfort for the passenger.
Therefore, the present invention has a construction as follows. A head rest control system in which a head rest of a seat of a vehicle is constructed to be moved back and forth by a head rest moving mechanism may include a sensor detecting a distance between the head rest and a head of a passenger, and a control device controllably actuating the head rest moving mechanism. The control device is constructed to actuate the head rest moving mechanism when the distance between the head rest and the head detected by the sensor is outside of a proper range of clearance in which it is possible to deal with a back-side collision of the vehicle, thereby moving the head rest to a proper position in which it is possible to deal with the back-side collision of the vehicle.

3 Claims, 8 Drawing Sheets

U.S. PATENT DOCUMENTS

| | | |
|---|---|---|
| 6,560,520 B2 | 5/2003 | Yokota et al. |
| 6,607,242 B2 | 8/2003 | Estrada et al. |
| 6,746,078 B2 | 6/2004 | Breed |
| 2003/0227199 A1 | 12/2003 | Yoshizawa et al. |
| 2006/0279114 A1 * | 12/2006 | Toda et al. ............... 297/216.12 |

FOREIGN PATENT DOCUMENTS

| | | |
|---|---|---|
| DE | 197 31 053 A1 | 1/1999 |
| DE | 199 16 804 C1 | 8/2000 |
| DE | 100 65 845 A1 | 8/2002 |
| JP | 1-254496 | 10/1989 |
| JP | 6-253946 | 9/1994 |
| JP | 11-334437 | 12/1999 |
| JP | 11-342821 | 12/1999 |
| JP | 2000-233713 | 8/2000 |
| JP | 2001-058552 | 3/2001 |
| JP | 2002-365011 | 12/2002 |
| JP | 2003-118531 | 4/2003 |
| JP | 2004-009891 | 1/2004 |
| JP | 2004-122856 | 4/2004 |

\* cited by examiner

HEAD REST CONTROL SYSTEMS

TECHNICAL FIELD

The present invention relates to head rest control systems that can control a distance between heads of passengers and head rests of vehicle seats by moving the head rests back and forth.

BACKGROUND ART

One known art for controlling movement of a head rest is taught by Patent Document 1. In this art, a collision prediction sensor, a head rest moving mechanism and a control device for controlling the head rest moving mechanism are used. The collision prediction sensor can predict a back-side collision of a vehicle a desired time (e.g., 1.0 second) before occurrence of the collision. The control device actuates the head rest moving mechanism in response to a signal from the collision prediction sensor, thereby moving the head rest forwardly from a normal position. As a result, the head rest moves closer to a head of a passenger so as to prepare a burden imposed on the passenger at the time of the back-side collision.

In a control of movement of the head rest as set forth in Patent Document 1, the vehicle must have the collision prediction sensor. In another known art, a thin plate-shaped capacitance sensor disposed in the head rest is used in place of the collision prediction sensor. The capacitance sensor may detect a relative position (distance) of the head rest relative to the passenger head without contact. The control device actuates the head rest moving mechanism in response to a signal from the capacitance sensor, thereby moving the head rest such that the distance between the head rest and the passenger head can be maintained constant.

An additional known art is taught by Patent Document 2. In this art, a head rest is constructed to move up and down in response to a signal from a capacitance sensor so as to follow a head of a passenger.

Patent Document 1: JP 2004-9891 A
Patent Document 2: JP 2000-309242 A

DISCLOSURE OF THE INVENTION

Problems to be Solved by the Invention

In order to deal with a collision, a vehicle without a collision prediction sensor can be provided with a control in which the head rest is moved in response to a signal from a capacitance sensor or other such sensors so as to follow a head of a passenger. However, in such a control, even if the head of the passenger moves slightly, the head rest can be moved in response to the motion of the passenger head. Such a motion of the head rest may cause discomfort to the passenger.

It is one object of the present invention to provide a control for moving a head rest in response to a signal from a sensor detecting a distance between the head rest and a head of a passenger, in which if the head of the passenger moves within a predetermined range, the head rest can be prevented from moving depending on the motion of the passenger head so as to remove discomfort for the passenger.

It is another object of the present invention to provide such a control, in which the head rest can be moved only in a predetermined period of time so as to increase a sense of use of the head rest.

It is further object of the present invention to provide such a control, in which the head rest can be moved only when the passenger head is continuously positioned outside of a proper range for a desired period of time so as to further increase the sense of use of the head rest.

It is further object of the present invention to provide such a control, in which the head rest moved to an optimal position when a back-side collision of a vehicle is expected can be prevented from affecting driving when the collision is avoided.

It is still further object of the present invention to provide such a control, in which ability to relieve a burden imposed on the passenger at the time of the back-side collision of the vehicle can be increased.

Means for Solving the Problems

In one aspect of the present invention, a head rest control system in which a head rest of a seat of a vehicle is constructed to be moved back and forth by a head rest moving mechanism is provided. The head rest control system includes a sensor detecting a distance between the head rest and a head of a passenger, and a control device controllably actuating the head rest moving mechanism. The control device is constructed to actuate the head rest moving mechanism so as to move the head rest forwardly or backwardly when the distance between the head rest and the head detected by the sensor is outside of a proper range of clearance in which it is possible to deal with a back-side collision of the vehicle, thereby moving the head rest to a proper position in which it is possible to deal with the back-side collision of the vehicle.

According to this aspect of the invention, even if the head of the passenger moves within the proper range of clearance in which it is possible to deal with the back-side collision of the vehicle, the head rest can be prevented from moving depending on the motion of the head of the passenger so as to prevent discomfort for the passenger. This may lead to an increased sense of use of the head rest. In addition, according to the head rest control system, it is possible to deal with the back-side collision of the vehicle even if the vehicle is not provided with a collision prediction sensor.

In another aspect of the present invention, a period of time in which it is necessary to deal with the back-side collision of the vehicle is determined, and wherein the control device is constructed to actuate the head rest moving mechanism only in the period of time, thereby moving the head rest to the proper position.

According to this aspect of the invention, the head rest is moved only in a period of time in which it is necessary to deal with the back-side collision of the vehicle, e.g., a period in which the passenger fastens a seatbelt or a period in which the vehicle is running. This may further increase the sense of use of the head rest.

In a further aspect of the present invention, the control device is constructed to actuate the head rest moving mechanism when the distance between the head rest and the head detected by the sensor is continuously outside of the proper range for a predetermined time, thereby moving the head rest to the proper position.

In a further aspect of the present invention, the control device is constructed to actuate the head rest moving mechanism when the distance between the head rest and the head detected by the sensor is continuously outside of the proper range for a predetermined time, thereby moving the head rest to the proper position.

According to these aspects, the head rest is moved only when the head of the passenger is continuously positioned outside of the proper range for the desired period of time. Therefore, the head rest can be prevented from always moving depending on the motion of the head of the passenger. This may further increase the sense of use of the head rest.

In a further aspect of the present invention, the control device is constructed to actuate the head rest moving mechanism when data for actuating the head rest moving mechanism is obtained for predetermined number of times within a predetermined time by comparing a value detected by the sensor and a predetermined value.

In a further aspect of the present invention, the control device is constructed to actuate the head rest moving mechanism when data for actuating the head rest moving mechanism is obtained for predetermined number of times within a predetermined time by comparing a value detected by the sensor and a predetermined value.

According to these aspects, if the head of the passenger is moved for a moment, the head rest is not moved. This does not cause discomfort to the passenger.

In a further aspect of the present invention, the head rest control system further includes a collision prediction sensor that can detect prediction of the collision, wherein the control device is constructed to actuate the head rest moving mechanism in response to a signal from the collision prediction sensor, thereby moving the head rest to an optimal position where the head rest is positioned closer to the head of the passenger than in the proper position in which it is possible to deal with the back-side collision of the vehicle and where a clearance is left between the head rest and the head of the passenger.

In a further aspect of the present invention, the head rest control system further includes a collision prediction sensor that can detect prediction of the collision, wherein the control device is constructed to actuate the head rest moving mechanism in response to a signal from the collision prediction sensor, thereby moving the head rest to an optimal position where the head rest is positioned closer to the head of the passenger than in the proper position in which it is possible to deal with the back-side collision of the vehicle and where a clearance is left between the head rest and the head of the passenger.

According to these aspects, when the back-side collision of the vehicle is predicted, the head rest can be quickly moved to the optimal position. Also, because the clearance is left between the head rest positioned on the optimal position and the head of the passenger, the head rest can be prevented from affecting driving when the collision is avoided.

In a further aspect of the present invention, the head rest control system further includes a collision prediction sensor that can detect the collision, wherein the control device is constructed to actuate the head rest moving mechanism in response to a signal from the collision prediction sensor, thereby moving the head rest to an optimal position in which the head rest contacts the head of the passenger from the proper position in which it is possible to deal with the back-side collision of the vehicle.

In a further aspect of the present invention, the head rest control system further includes a collision prediction sensor that can detect the collision, wherein the control device is constructed to actuate the head rest moving mechanism in response to a signal from the collision prediction sensor, thereby moving the head rest to an optimal position in which the head rest contacts the head of the passenger from the proper position in which it is possible to deal with the back-side collision of the vehicle.

According to these aspects, it is possible to increase ability to relieve a burden imposed on the passenger at the time of the back-side collision.

DESCRIPTION OF THE REFERENCE SYMBOLS

10 Seat
20 Head Rest
30 Head Rest Moving Mechanism
40 Sensor
44 Control Means
H Passenger
L Distance

BEST MODE FOR CARRYING OUT THE INVENTION

Best mode for carrying out the present invention will be described hereinafter with reference to the drawings.

Figure 1:
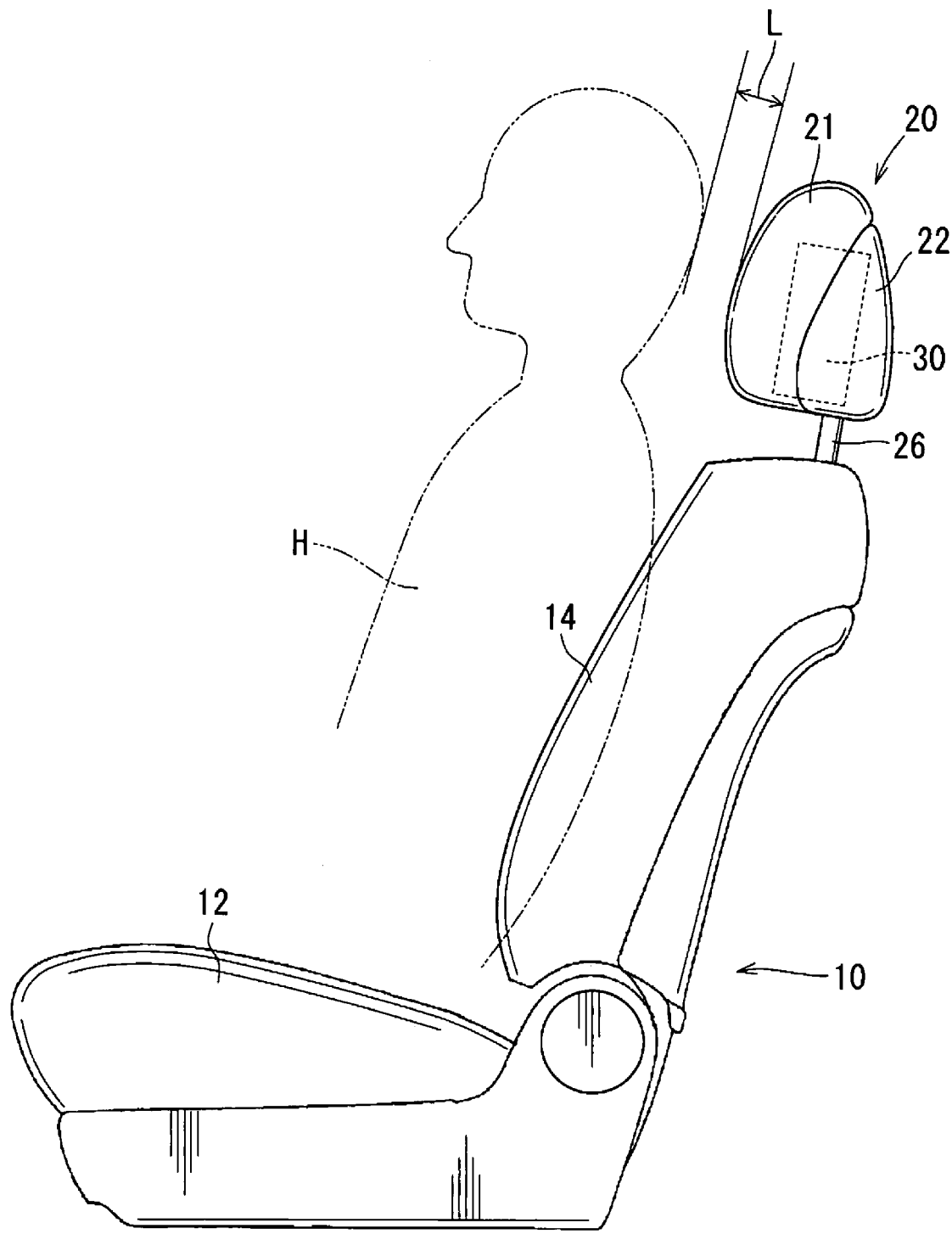
FIG. 1 is a side view of a seat of a vehicle.

FIG. 1 is a side view of a seat of a vehicle. The seat 10 shown in this drawing is composed of a seat cushion 12, a seat back 14 and a head rest 20. The head rest 20 is positioned near a center of an upper surface of the seat back 14. The head rest 20 includes a pair of stays 26 that extend downwardly from a lower surface thereof. The stays 26 are coupled to a frame (not shown) disposed in the seat back 14.

Figure 2:
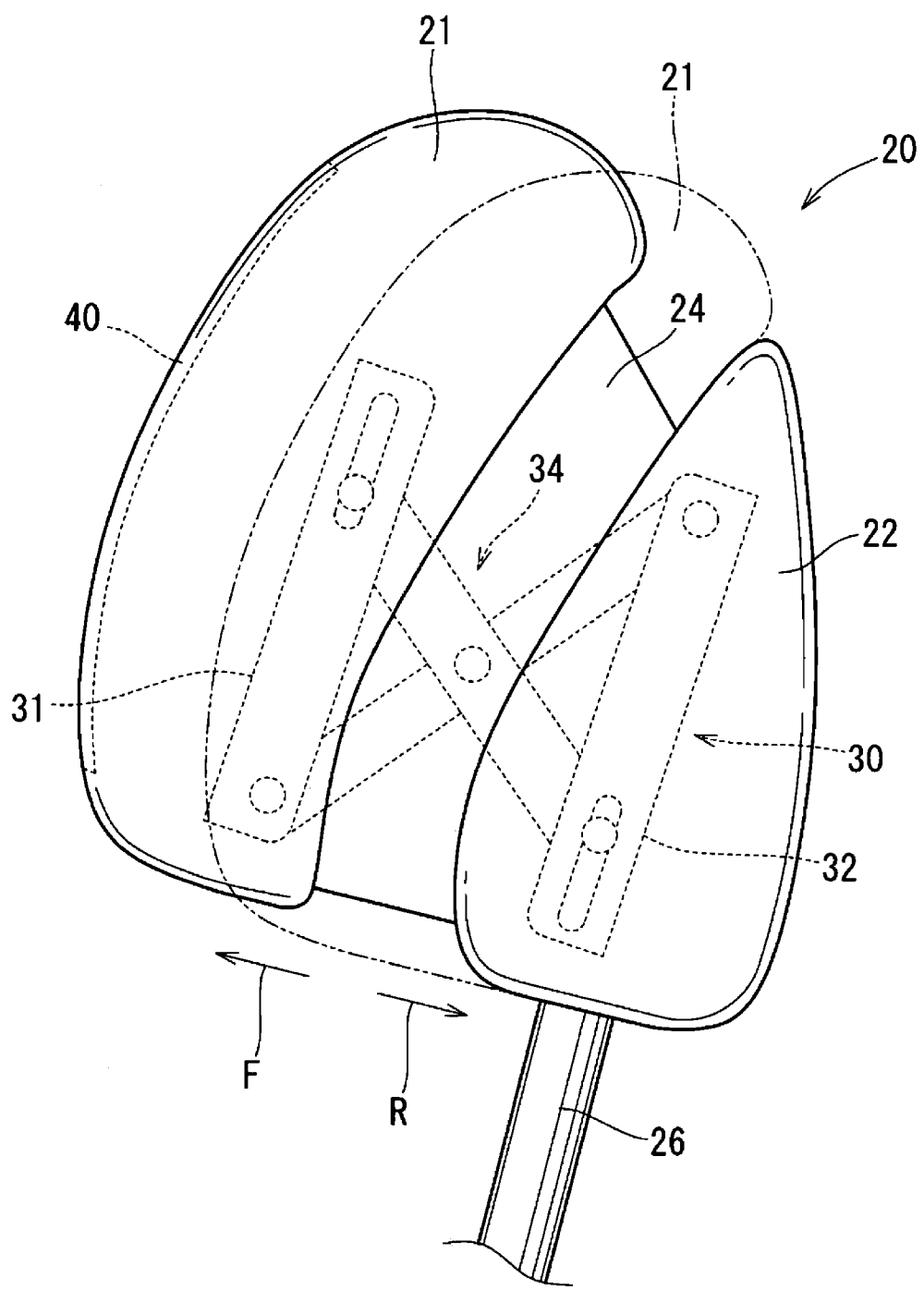
FIG. 2 is an enlarged side view of a head rest.

FIG. 2 is an enlarged side view of a head rest 20. The head rest 20 is divided to a front head rest element 21 and a rear head rest element 22. Further, the head rest 20 includes a head rest moving mechanism 30 that is incorporated thereinto. Upon actuation of the head rest moving mechanism 30, the front head rest element 21 can be moved back and forth of the vehicle relative to the rear head rest element 22. That is, the head rest element 21 can be moved between a retracted position (a broken line in FIG. 2) in which dividing lines of the head rest elements 21 and 22 contact each other and an extended position (a solid line in FIG. 2) in which the front head rest element 21 is forwardly positioned obliquely upward from the retracted position. Thus, by moving the head rest element 21, as shown in FIG. 1, a distance L between a head of a passenger H sitting on the seat 10 and the head rest 20 can be controlled.

As shown in FIG. 2, the front head rest element 21 includes cover members 24 that respectively extends from both sides of the head rest element 21 toward the rear head rest element 22. The cover members 24 are inserted into the head rest element 22 so as to be overlapped thereto. This overlapping portion is designed so as to cover a space between the dividing lines of the head rest elements 21 and 22 even if the head rest element 21 moves to the extended position shown by a solid line in FIG. 2. Further, an upper side of the head rest 20 is provided with a cover sheet (not shown) that covers a space between the cover members 24. This cover sheet is formed from a resin film or other such films so as to be flexibly deformed when the head rest element 21 is moved. Thus, an inside of the head rest 20 can be concealed after the head rest element 21 moves from the retracted position to the extended position or while the head rest element 21 moves from the retracted position to the extended position. In addition, any objects or materials can be prevented from entering thereinto.

Figure 3:
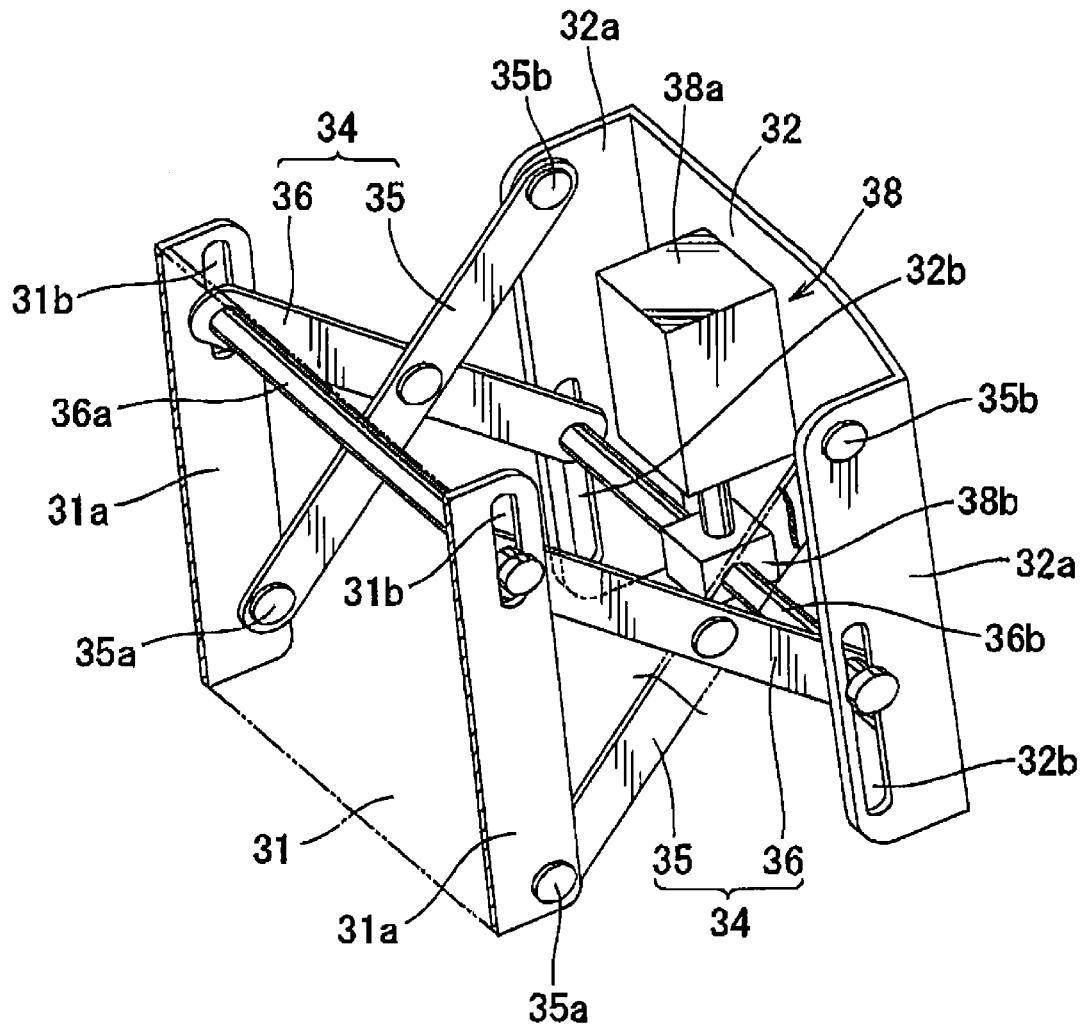
FIG. 3 is a perspective view of a head rest moving mechanism, which illustrates a structure thereof.

FIG. 3 is a perspective view of a head rest moving mechanism 30, which illustrates a structure thereof. The structure of the head rest moving mechanism 30 will be briefly described based on this drawing.

The head rest moving mechanism 30 includes a pair of front and rear bases 31 and 32 that are connected by a pair of right and left X-shaped links 34. The base 31 is received in the front head rest element 21 and is connected thereto. The base 32 is received in the rear head rest element 22 and is connected thereto. Further, each of the pair of links 34 is composed of two link members 35 and 36. The link members 35 and 36 are rotatably interconnected at central portions thereof. Both ends of the link members 35 and 36 are respectively connected to both side walls 31a and 32a of the bases 31 and 32.

In particular, with regard to the link members 35 of the pair of links 34, front ends (lower ends) thereof are respectively rotatably connected to the side walls 31a of the base 31 via pivot pin 35a, and rear ends (upper ends) thereof are respectively rotatably connected to the side walls 32a of the base 32 via pivot pin 35b. With regard to the link members 36 of the pair of links 34, front ends (upper ends) and rear ends (lower ends) thereof are respectively interconnected via shafts 36a and 36b. Both ends of the shaft 36a are slidably engaged with vertically elongated guide slots 31b formed in the side walls 31a of the base 31. Both ends of the shaft 36b are slidably engaged with vertically elongated guide slots 32b formed in the side walls 32a of the base 32.

The rear base 32 includes an electric drive unit 38 as an actuator of the moving mechanism 30. The electric drive unit 38 includes a motor 38a that is attached to an inside of the base 32. A drive shaft of the motor 38a is connected to the shaft 36b of the links 34 via a ball screw mechanism 38b. The ball screw mechanism 38b may function to change normal or reverse rotation of the motor 38a (the drive shaft) to upward and downward motion of the shaft 36b. Thus, by controllably operating the electric drive unit 38, the X-shaped links 34 can move like a pantograph, so that the front base 31 can move toward and away from the rear base 32. As a result, the head rest element 21 can move between the retracted position and the extended position along a circular arc-shaped trajectory.

Figure 4:
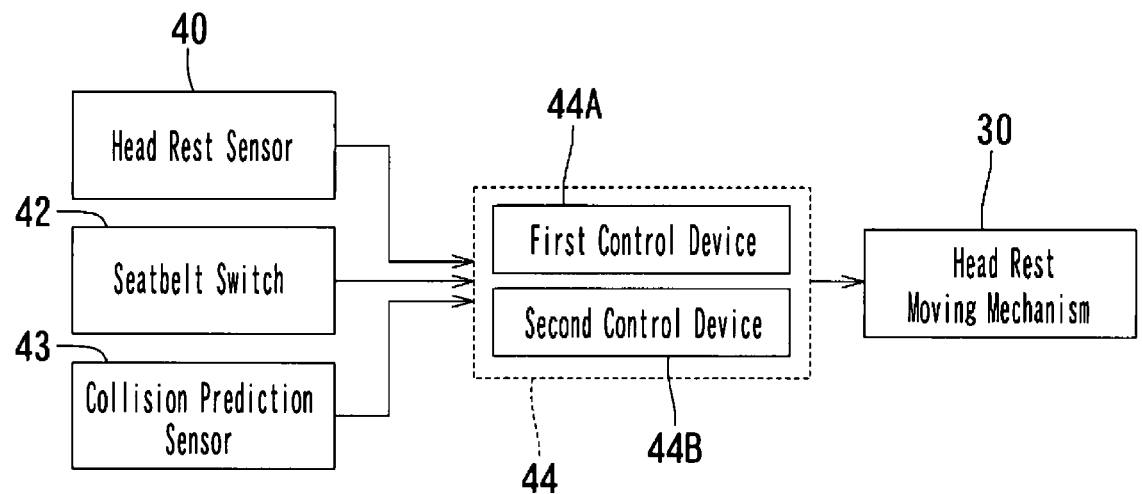
FIG. 4 is a block diagram of a head rest control system.

FIG. 4 is a block diagram of a head rest control system. A head rest sensor 40 shown in this drawing is a thin plate-shaped flexible capacitance sensor that is provided to an inner side of a covering of the front head rest element 21 (FIG. 2). The sensor 40 can detect a relative position (the distance L) of the head rest relative to the head of the passenger H without contact. In the present invention, the head rest sensor 40 corresponds to "a sensor for detecting a distance between a head rest and a head of a passenger." A seatbelt switch 42 is a switch for detecting that the passenger H fastens a seatbelt (not shown). Also, a collision prediction sensor 43 is a sensor that is incorporated into a pre-crush safety system in order to detect a distance between the vehicle and a backward vehicle or a relative speed therebetween. The sensor 43 cooperates with a function of the system to predict a back-side collision, thereby generating a detection signal to a control device 44.

The control device 44 includes a first control device 44A that controllably actuates the head rest moving mechanism 30 in response to a detection signal from the head rest sensor 40, and a second control device 44B that controllably actuates the head rest moving mechanism 30 in response to the detection signal from the collision prediction sensor 43. That is, the motor 38a of the electric drive unit 38 can be controllably rotated in a normal or reverse direction in response to a control signal from the control device 44. Further, because the head rest sensor 40 (the capacitance sensor), the seatbelt switch 42 and the collision prediction sensor 43 are respectively known in the art, a detailed description of structures of such elements may be omitted.

Figure 5:
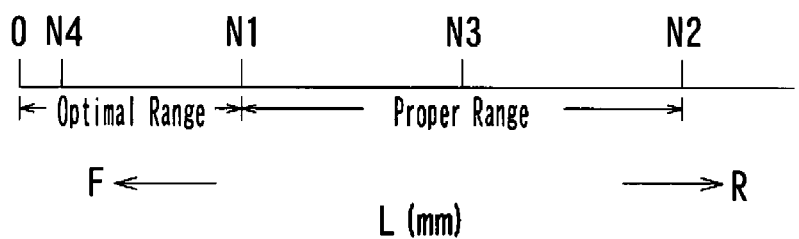
FIG. 5 is an explanatory view illustrating a distance between the head rest and a head of a passenger.

FIG. 5 is an explanatory view illustrating the distance L (mm) between the head rest 20 and the head of the passenger H. Values N1, N2, N3 and N4 in this drawing respectively refer to predetermined desired values of the distance L. As will be apparent from FIG. 5, the predetermined values of the distance L are determined so as to have a relation (N4<N1<N3<N2). The value N3 corresponds to a proper position of the head rest 20 in which it is possible to deal with the back-side collision of the vehicle. A range between the values N1 and N2 including this proper position corresponds to a proper range of the head rest 20. Further, a range not greater than the value N1 including the value N4 corresponds to an optimal range. In the optimal range, the head rest 20 is positioned closer to the passenger head than in the proper range. Also, in this range, a desired clearance is left between the head rest 20 and the passenger head, or the head rest 20 contacts the passenger head. In particular, if a torso angle of the seat back 14 is a typical range (19-23 degrees), when the head rest 20 is positioned at the proper position (N3), the distance L is about 20 mm. Also, when the head rest 20 is positioned at the optimal range (the range not greater than the value N1), the distance L is about 0-80 mm. Further, arrows in FIG. 5 respectively correspond to arrows in FIG. 2.

Figure 6:
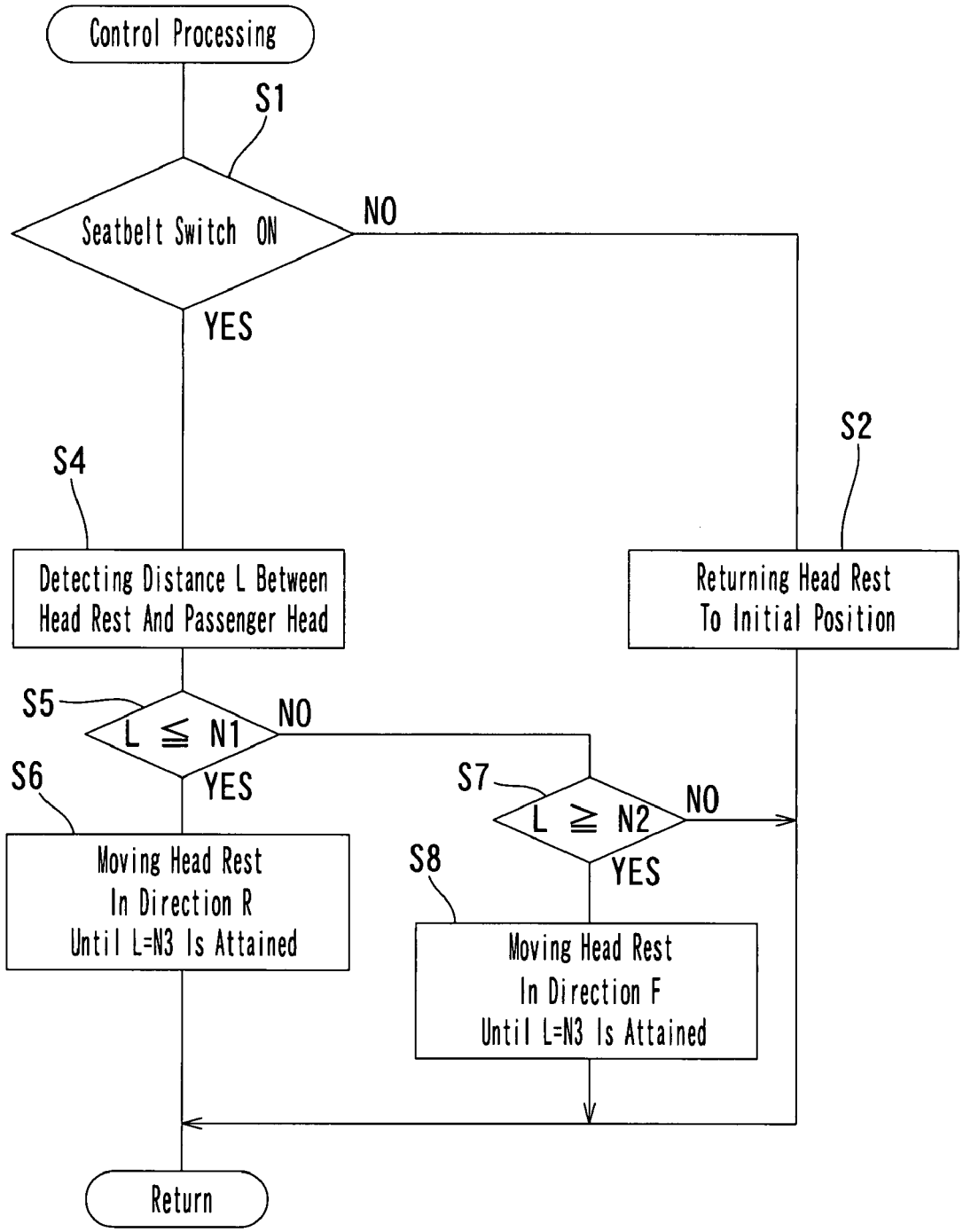
FIG. 6 is a flow chart illustrating a control of movement of the head rest.
Figure 7:
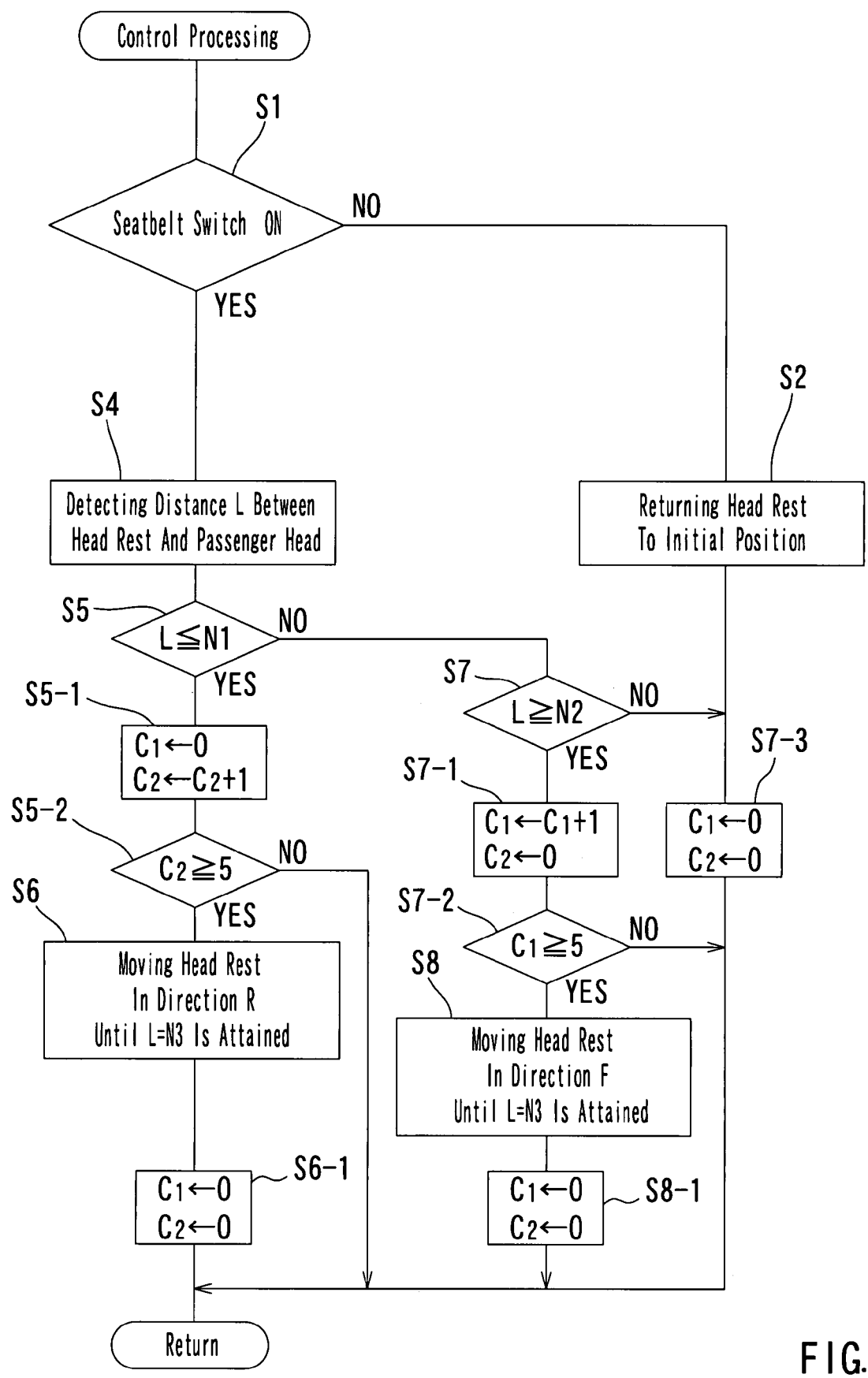
FIG. 7 is another flow chart illustrating a control of movement of the head rest.

FIGS. 6 and 7 are flow charts illustrating controls of movement of the head rest 20 (the head rest element 21) by means of the first control device 44A. Control processing shown in these flow charts is started when, for example, an ignition switch (not shown) is turned on. Thereafter, the control processing is repeated in a desired time interval. Further, references C1 and C2 shown in the flow charts of FIG. 7 correspond to counter variables having a default value of "0."

A control flow shown in FIG. 6 will be described. First, in step S1, it is determined if an ON signal is transmitted from the seatbelt switch 42. Based on the determination result, if the seatbelt switch 42 is OFF, it is determined that the vehicle is not scheduled to be used. Therefore, in step S2, the head rest 20 (the head rest element 21) is returned to an initial position, and then the processing is directly terminated (returned). Conversely, if the seatbelt switch 42 is ON, in step S4, the detection signal from the head rest sensor 40 is read, so that the distance L between the head rest 20 (the head rest element 21) and the head of the passenger H is detected.

Subsequently, in step S5, it is determined if the distance L is not greater than the desired value N1. Based on the determination result, if the distance L is not greater than the desired value N1, in step S6, an operation signal is transmitted to the head rest moving mechanism 30, so that the head rest element 21 is moved in the direction (rearwardly) shown by arrow R in FIG. 2 until the distance L reaches to the desired value N3. Based on the determination result in step S5, if the distance L is greater than the desired value N1, in step S7, it is determined if the distance L is not less than the desired value N2. Based on the result, if the distance L is not less than the desired value N2, in step S8, the head rest element 21 is moved in the direction (forwardly) shown by arrow F in FIG. 2 until the distance L reaches to the desired value N3. Further, in the determination result in step S7, if the distance L is less than the desired value N2, the processing is directly terminated (returned).

According to the processing of step S5 and later, if the distance L is greater than the desired value N1 and less than the desired value N2 (the proper range of the head rest 20), the head rest element 21 is not moved. Therefore, if the head of the passenger H is moved within such a range, the head rest element 21 is not moved. Thus, it is possible to remove discomfort resulting from the fact that the head rest element 21 is moved every time the passenger head is moved.

Next, a control flow shown in FIG. 7 will be described. The flow chart of FIG. 7 includes determination processes that are added after step S5 of the flow chart of FIG. 6, which determination processes may determine as to whether counters of the control processing reach to predetermined reference values. Therefore, in the flow chart of FIG. 7, steps that are the same in the flow chart of FIG. 6 will be identified by the same reference numerals and a detailed description will be omitted.

In step S5 of FIG. 7, if the distance L is not greater than the desired value N1, in step S5-1, the counter variable C1 is set to "0." At the same time, "1" is added to the counter variable C2. Next, in step S5-2, a determination is performed with regard to the counter variable C2. As a result, if the counter variable C2 is "5" (the predetermined reference value) or more, in step S6, as previously described, the head rest element 21 is moved in the direction shown by arrow R until the distance L reaches to the desired value N3 (20 mm) Subsequently, in step S6-1, the counter variables C1 and C2 are set to "0," and then the processing is terminated (returned). Conversely, as a result of the determination in step S5-2, if the counter variable C2 is less than "5," the processing is directly terminated.

In step S7 of FIG. 7, if the distance L is not less than the desired value N2, in step S7-1, "1" is added to the counter variable C1. At the same time, the counter variable C2 is set to "0." Thereafter, in step S7-2, a determination is performed with regard to the counter variable C1. In step S7, if the distance L is less than the desired value N2, in step S7-3, the counter variables C1 and C2 are set to "0," and then the processing is terminated.

As a result of the determination in step S7-2, if the counter variable C1 is "5" (the predetermined reference value) or more, in step S8, as previously described, the head rest element 21 is moved in the direction shown by arrow F until the distance L reaches to the desired value N3. Subsequently, in step S8-1, the counter variables C1 and C2 are set to "0," and then the processing is terminated. Conversely, as a result of the determination in step S7-2, if the counter variable C1 is less than "5," the processing is directly terminated.

Figure 8:
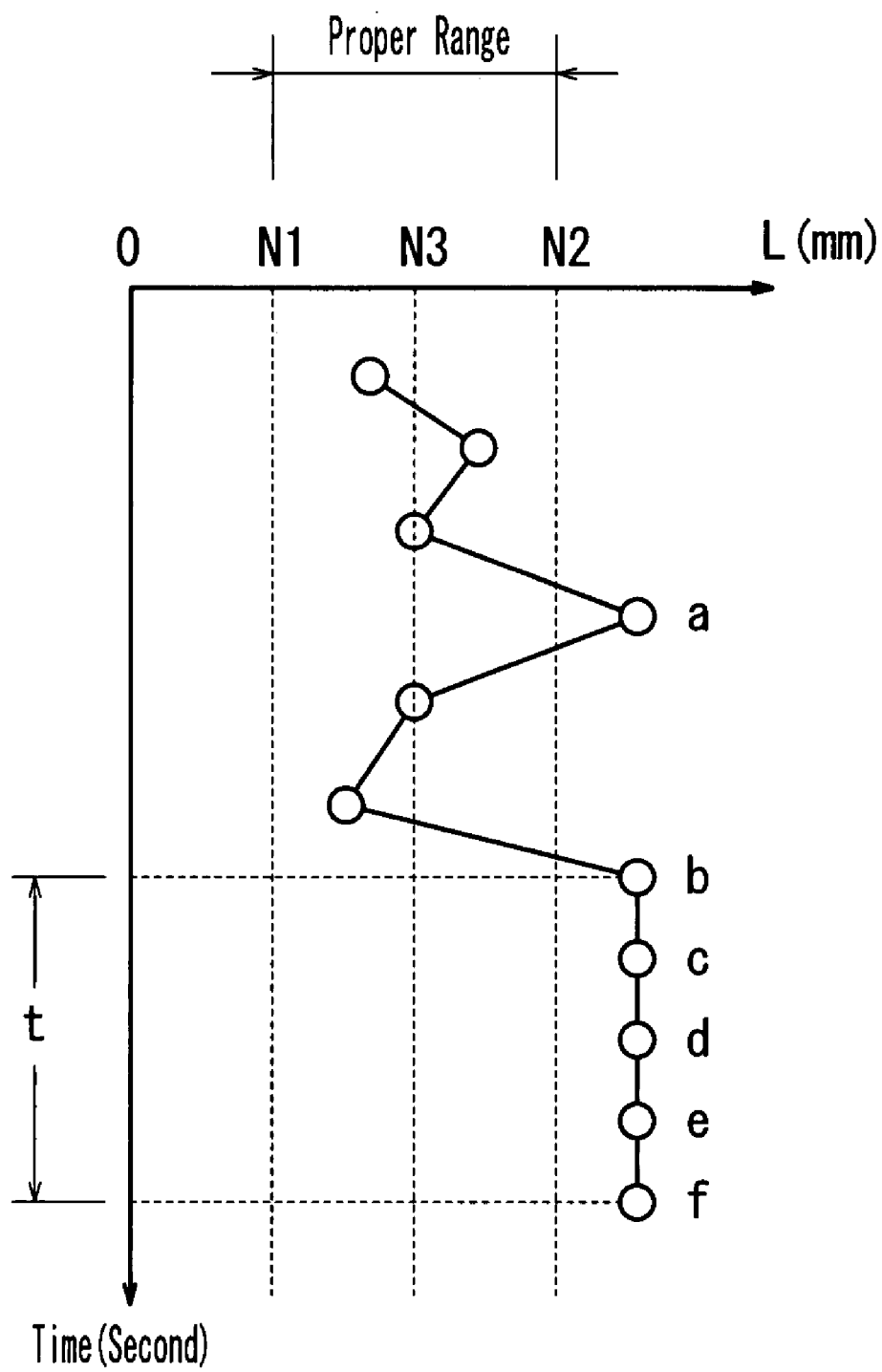
FIG. 8 is an explanatory view exemplarily illustrating a change pattern of the distance between the head rest and the passenger head.

FIG. 8 is an explanatory view exemplarily illustrating a change pattern of the distance L against time. That is, this drawing shows a concept for determining the reference value "5" of the counter variables C1 and C2. In this drawing, the vertical and lateral axes respectively correspond to time (second) and the distance L (mm) In the change pattern of the distance L, as shown by a determined value a, even if the distance L is outside of the proper range (the range between the references N1 and N2) of the head rest 20 only once, the head rest moving mechanism 30 is not actuated based on the control shown in FIG. 7 if the distance L falls within the proper range immediately thereafter. To the contrary, as shown by determined values b-f, if the distance L is continuously outside of the proper range of the head rest 20 for predetermined number of times (5 times) within a predetermined time t, the head rest moving mechanism 30 is actuated when the determined value f is counted.

Thus, according to the control shown in FIG. 7, the head rest moving mechanism 30 is actuated only when the determined value of the distance L is continuously outside of the proper range of the head rest 20 for 5 times, so that the head rest element 21 of the head rest 20 is moved in the direction shown by arrow R or F. If the determined value of the distance L is not continuously outside of the proper range of the head rest 20 for 5 times, the head rest element 21 of the head rest 20 is not moved. That is, the head rest moving mechanism 30 is controlled so as to be actuated only when data for actuating the head rest moving mechanism 30 is obtained for predetermined number of times within a predetermined time. As a result, even if the head of the passenger H is moved instantaneously, the head rest element 21 is prevented from moving in response to the motion of the passenger head.

In the controls shown in FIGS. 6 and 7, the determination of the ON or OFF signal from the seatbelt switch 42 (or a passenger sensor) is used as a means for determining a desired period of time in which it is necessary to deal with the backside collision of the vehicle by moving the head rest 20. Such a period of time can be determined based on a running condition of the vehicle or a posture of the passenger H. Examples of conditions for determining such a period of time are as follows:

(1) When the speed of the vehicle is reduced to below a predetermined speed because of traffic jams except that the vehicle is stopped.

(2) When the vehicle is applied with a brake.

(3) When windshield wipers are used in the rain.

(4) When the ambient temperature is reduced to below a temperature that can produce road surface freezing.

(5) When the steering angle is in a predetermined angle range (when the passenger H is in a normal sitting posture).

(6) When switches of an audio instrument and an air conditioner are not operated.

The reason that the desired period of time is determined based on the above-described conditions (5) and (6) is to prevent the head rest 20 from moving when the passenger H is not in the normal sitting posture. Further, it is preferred that the head rest 20 is positioned rearwardly when the vehicle is moved backward, because the head rest 20 thus positioned does not affect driving in which the passenger turns backward. Therefore, in the controls shown in FIGS. 6 and 7, when a signal representative of a reverse position of a shift lever is transmitted, the head rest element 21 is moved in the direction shown by arrow R in FIG. 2 so as to be held in a rearward position. Further, when the signal representative of the reverse position of the shift lever is transmitted during the processing in step S8 in FIGS. 6 and 7, the head rest element 21 is quickly moved in the direction shown by arrow R so as to be held in the rearward position after the head rest moving mechanism 30 is deactuated.

Figure 9:
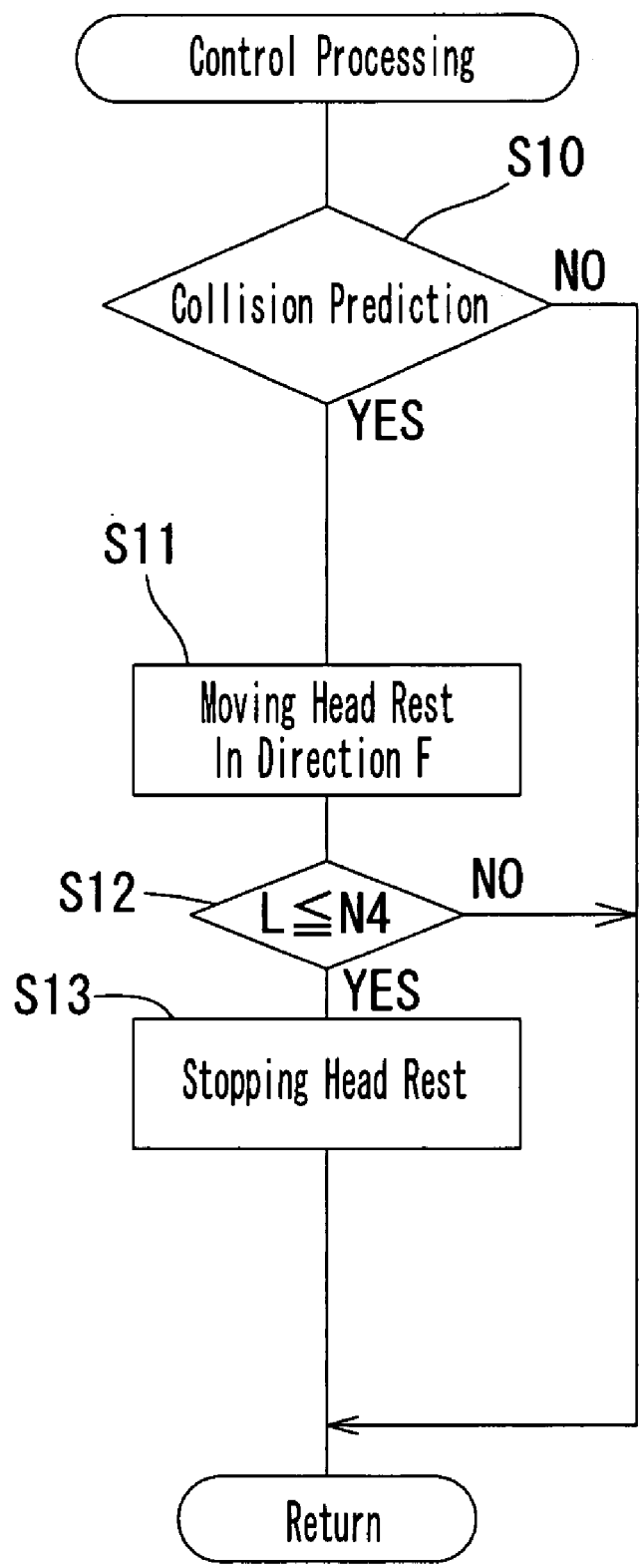
FIG. 9 is a further flow chart illustrating a control of movement of the head rest.

FIG. 9 is a flow chart illustrating a control of movement of the head rest 20 (the head rest element 21) by means of the second control means 44B. Control processing shown in this drawing is performed alternately with the control processing shown in FIG. 6 or 7 at a desired time interval.

In step S10 shown in FIG. 9, it is determined if a signal is transmitted from the collision prediction sensor 43. Based on the determination result, if a prediction signal is not transmitted, the processing is directly terminated (returned). Conversely, if the prediction signal is transmitted, in step S11, a signal is transmitted to the head rest moving mechanism 30 in order to move the head rest 20 (the head rest element 21) in the direction shown by arrow F in FIG. 2.

Subsequently, in step S12, it is determined if the distance L between the head rest 20 and the head of the passenger H is not greater than the desired value N4. Based on the determination result, if the distance L is not greater than the desired value N4, in step S13, a signal is transmitted in order to deactuate the head rest moving mechanism 30, so that the head rest 20 (the head rest element 21) is stopped, thereby terminating the processing. Further, in step S13, if the distance L is greater than the desired value N4, the processing is directly terminated.

According to the head rest control system of the present embodiment, when the vehicle is in an ordinary condition, the head rest element 21 is controllably moved by means of the first control means 44A such that the distance L between the head rest 20 and the head of the passenger H falls within the proper range in which it is possible to deal with the back-side collision. When it is determined that the signal is transmitted from the collision prediction sensor 43, the head rest element 21 is moved toward the head of the passenger H by means of the second control means 44B. Thus, the distance L is changed from the proper range to the optimal range of about the desired value N4. As a result, when the back-side collision of the vehicle is predicted, the head rest 20 can be quickly moved to an optimal position in which it is possible to deal with the back-side collision.

When the distance L is controlled to about the desired value N4 by means of the second control means 44B, the clearance is left between the head rest 20 and the head of the passenger H. Therefore, the head rest 20 does not affect driving when the collision is avoided. However, if it is important to increase ability to relieve a burden imposed on the passenger at the time of the back-side collision, the distance L can be controlled to zero by means of the second control means 44B so that the head rest 20 can contact the head of the passenger H.

Because the head rest 20 can be quickly moved to the optimal position by means of the second control means 44B, the detection timing by the collision prediction sensor 43 can be delayed until just before the collision, e.g., about 0.5 second before the collision, from the conventional timing, i.e., 1.0 second before the collision. However, if the detection timing by the collision prediction sensor 43 is adjusted to about 1.0 second before the collision as before, it is possible to reduce the moving speed of the head rest element 21, i.e., the operation speed of the head rest moving mechanism 30. As a result, a low-power motor can be used as the motor 38a of the electric drive unit 38.

Although best mode for carrying out the present invention is described with reference to the drawings, various changes and modifications may be made to the present embodiment without departing from the spirit of the invention.

For example, in the embodiment described above, although the head rest element 21, a part of the head rest 20, is moved, the whole head rest 20 can be controllably moved depending on the types of the head rest 20 and the head rest moving mechanism 30. Further, because the head rest 20 can be quickly moved to the optimal position by means of the second control means 44B, the collision prediction sensor 43 can be replaced with a collision sensor (not shown). In such a case, in step S10 shown in FIG. 9, it is determined if a signal is transmitted from the collision sensor. Moreover, the control in the flow chart shown in FIG. 9 can be carried out by interrupt processing to the control in the flow chart shown in FIG. 6 or 7.

The invention claimed is:

1. A head rest control system in which a head rest of a seat of a vehicle is constructed to be moved back and forth by a head rest moving mechanism, comprising:
   a sensor detecting a distance between the head rest and a head of a passenger;
   a control device controllably actuating the head rest moving mechanism, and
   a collision prediction sensor that can detect prediction of the collision,
   wherein the control device is constructed to actuate the head rest moving mechanism so as to move the head rest forwardly or backwardly when the distance between the head rest and the head detected by the sensor is outside of a predetermined proper range of clearance for a back-side collision of the vehicle, thereby moving the head rest to a proper position for the back-side collision of the vehicle,
   wherein a period of time before the back-side collision of the vehicle is determined, and wherein the control device is constructed to actuate the head rest moving mechanism only in the period of time, thereby moving the head rest to the proper position, and
   wherein the control device is constructed to actuate the head rest moving mechanism in response to a signal from the collision prediction sensor, thereby moving the head rest to an optimal position where the head rest is positioned closer to the head of the passenger than in the proper position for the back-side collision of the vehicle and where a clearance is left between the head rest and the head of the passenger.

2. The head rest control system as defined in claim 1, wherein the control device is constructed to actuate the head rest moving mechanism when the distance between the head rest and the head detected by the sensor is continuously outside of the proper range for a predetermined time, thereby moving the head rest to the proper position.

3. The head rest control system as defined in claim 2, wherein the control device is constructed to actuate the head rest moving mechanism when data for actuating the head rest moving mechanism is obtained for predetermined number of times within a predetermined time by comparing a value detected by the sensor and a predetermined value.

* * * * *